United States Patent
Kook et al.

(10) Patent No.: US 9,534,667 B1
(45) Date of Patent: Jan. 3, 2017

(54) TRANSMISSION FOR VEHICLE

(71) Applicant: Hyundai Motor Company, Seoul (KR)

(72) Inventors: Jae Chang Kook, Hwaseong-si (KR); Seong Wook Hwang, Gunpo-si (KR); Hyun Sik Kwon, Seoul (KR); Seong Wook Ji, Ansan-si (KR); Won Min Cho, Hwaseong-si (KR); Wook Jin Jang, Yongin-si (KR); Myeong Hoon Noh, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/884,614

(22) Filed: Oct. 15, 2015

(30) Foreign Application Priority Data

Jun. 11, 2015 (KR) .......................... 10-2015-0082501

(51) Int. Cl.
*F16H 3/66* (2006.01)

(52) U.S. Cl.
CPC ......... *F16H 3/66* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| 7,993,235 | B2 | 8/2011 | Wittkopp et al. | |
|---|---|---|---|---|
| 8,052,567 | B2 | 11/2011 | Hart et al. | |
| 2008/0182706 | A1* | 7/2008 | Phillips | F16H 3/66 475/276 |
| 2008/0242486 | A1* | 10/2008 | Hart | F16H 3/66 475/276 |
| 2010/0216588 | A1* | 8/2010 | Wittkopp | F16H 3/66 475/275 |
| 2012/0115672 | A1* | 5/2012 | Gumpoltsberger | F16H 3/66 475/276 |
| 2012/0122627 | A1* | 5/2012 | Gumpoltsberger | F16H 3/66 475/276 |

FOREIGN PATENT DOCUMENTS

KR 2013-0003981 A 1/2013

* cited by examiner

*Primary Examiner* — Justin Holmes
(74) *Attorney, Agent, or Firm* — Morgan, Lewis & Bockius LLP

(57) ABSTRACT

A transmission for a vehicle includes: a first planetary gear set, a second planetary gear set, a third planetary gear set, and a fourth planetary gear set each including three rotary elements; and a plurality of friction members for controlling rotation of the rotary elements. The transmission improves fuel efficiency by implementing multiple steps of shifting and improves vehicle driving comfort by using operating points in a low RPM range of an engine.

10 Claims, 1 Drawing Sheet

| RANGE | C1 | C2 | C3 | C4 | C5 | C6 | GEAR RATIO |
|-------|----|----|----|----|----|----|------------|
| 1ST   |    | O  |    | O  | O  |    | 4.700      |
| 2ND   |    | O  |    |    | O  | O  | 2.643      |
| 3RD   |    | O  | O  |    | O  |    | 1.787      |
| 4TH   |    |    | O  | O  | O  |    | 1.356      |
| 5TH   |    |    | O  |    | O  | O  | 1.118      |
| 6TH   |    | O  | O  | O  |    | O  | 1.000      |
| 7TH   | O  | O  | O  |    |    |    | 0.787      |
| 8TH   | O  |    | O  | O  |    | O  | 0.593      |
| 9TH   | O  | O  |    |    |    | O  | 0.556      |
| 10TH  | O  |    |    |    | O  | O  | 0.365      |
| REV   | O  |    |    | O  | O  |    | −3.055     |

TRANSMISSION FOR VEHICLE

CROSS REFERENCE TO RELATED APPLICATION

The present application claims priority of Korean Patent Application Number 10-2015-0082501 filed on Jun. 11, 2015, the entire contents of which application are incorporated herein for all purposes by this reference.

BACKGROUND OF THE INVENTION

1. Field of the Invention

The present invention relates to a transmission for a vehicle that can improve fuel efficiency by implementing multiple steps of shifting and improve vehicle driving comfort by using operating points in a low revolution per minute (RPM) range of an engine.

2. Description of the Related Art

Recently, increasing oil prices have caused vehicle manufacturers all over the world to rush into infinite competition. Particularly in the case of engines, manufacturers have been pursuing efforts to reduce the weight and improve fuel efficiency of vehicles by reducing engine size, etc.

As for an automatic transmission, there are various methods of improving fuel efficiency, and operability and competitiveness in fuel efficiency can both be secured by implementing multiple steps of shifting.

However, when the shift ranges increase, the number of parts in an automatic transmission also increases, so the automatic transmission may be difficult to mount, the manufacturing cost and weight may be increased, and power transmission efficiency may be deteriorated.

Accordingly, in order to increase the effect of improving fuel efficiency through multiple steps of shifting, it may be important to develop a gear train structure that can achieve maximum efficiency with fewer parts.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

Accordingly, the present invention has been made keeping in mind the above problems occurring in the related art, and the present invention provides a transmission for a vehicle that can improve fuel efficiency by implementing multiple steps of shifting and improve vehicle driving comfort by using operating points in a low RPM range of an engine.

In order to achieve the above object, according to one aspect of the present invention, there is provided a transmission for a vehicle that includes: a first planetary gear set, a second planetary gear set, a third, planetary gear set, and a fourth planetary gear set each including three rotary elements; and a plurality of friction members, in which the first planetary gear set includes: a first rotary element connected to an input shaft; a second rotary element operating as a selectively-fixed element and selectively connected with a first rotary element of the second planetary gear set and a first rotary element of the third planetary gear set; and a third rotary element selectively connected with the first rotary element of the second planetary gear set and connected with a second rotary element of the second planetary gear set, the third planetary gear set includes: the first rotary element selectively connected with a third rotary element of the second planetary gear set; a second rotary element connected to the input shaft; and a third rotary element connected to an output shaft, the fourth planetary gear set includes: a first rotary element selectively connected with the first rotary element of the second planetary gear set; a second rotary element connected to the output shaft; and a third rotary element operating as a fixed element, and the friction members are connected to at least one or more of the rotary elements of the planetary gear sets and control rotation of the rotary elements.

In the first planetary gear set, the first rotary element may be a first sun gear, the second rotary element may be a first carrier, and the third rotary element may be a first ring gear; in the second planetary gear set, the first rotary element may be a second sun gear, the second rotary element may be a second carrier, and the third rotary element may be a second ring gear; in the third planetary gear set, the first rotary element may be a third sun gear, the second rotary element may be a third carrier, and the third rotary element may be a third ring gear; and in the fourth planetary gear set, the first rotary element may be a fourth sun gear, the second rotary element may be a fourth carrier, and the third rotary element may be a fourth ring gear.

The second rotary element of the first planetary gear set may be connected to or disconnected from a transmission case by engaging or disengaging a first clutch; the second rotary element of the first planetary gear set and the first rotary element of the second planetary gear set may be connected to or disconnected from each other by engaging or disengaging a second clutch; the second rotary element of the first planetary gear set and the first rotary element of the third planetary gear set may be connected to or disconnected from each other by engaging or disengaging a third clutch; and the third rotary element of the first planetary gear set and the first rotary element of the second planetary gear set may be connected to or disconnected from each other by engaging or disengaging a fourth clutch.

The first rotary element of the third planetary gear set and the third rotary element of the second planetary gear set may be connected to or disconnected from each other by engaging or disengaging a sixth clutch.

The first rotary element of the fourth planetary gear set and the first rotary element of the second planetary gear set may be connected to or disconnected from each other by engaging or disengaging a fifth clutch.

The first planetary gear set, the second planetary gear set, the third planetary gear set, and the fourth planetary gear set may be sequentially arranged in an axial direction of the input shaft or the output shaft.

The friction members may include: a first clutch disposed for selectively connecting the second rotary element of the first planetary gear set and a transmission case; a second clutch disposed for selectively connecting the second rotary element of the first planetary gear set and the first rotary element of the second planetary gear set; a third clutch disposed for selectively connecting the second rotary element of the first planetary gear set and the first rotary element of the third planetary gear set; a fourth clutch disposed for selectively connecting the third rotary element of the first planetary gear set and the first rotary element of the second planetary gear set; a firth clutch disposed for selectively connecting the first rotary element of the second planetary gear set and the first rotary element of the fourth planetary gear set; and a sixth clutch disposed for selectively connecting the third rotary element of the second planetary gear set and the first rotary element of the third planetary gear set.

In order to achieve the above object, according to another aspect of the present invention, there is provided a transmission for a vehicle that includes: a first planetary gear set, a second planetary gear set, a third planetary gear set, and a fourth planetary gear set each including three rotary elements; an input shaft connected to a first rotary element of the first planetary gear set and a second rotary element of the third planetary gear set; a first shaft connecting a second rotary element of the first planetary gear set, a first clutch, a second clutch, and a third clutch; a second shaft connecting a third rotary element of the first planetary gear set, a second rotary element of the second planetary gear set, and a fourth clutch; a third shaft connecting a first rotary element of the second planetary gear set, the second clutch, the fourth clutch, and a fifth clutch; a fourth shaft connecting a third rotary element of the second planetary gear set and a sixth clutch; a fifth shaft connecting a first rotary element of the third planetary gear set, the third clutch, and the sixth clutch; a sixth shaft connecting a first rotary element of the fourth planetary gear set and the fifth clutch; an output shaft connecting a third rotary element of the third planetary gear set and a second rotary element of the fourth planetary gear set; and a transmission case connected with a third rotary element of the fourth planetary gear set and the first clutch.

The first clutch may be disposed for selectively connecting the first shaft and the transmission case; the second clutch may be disposed for selectively connecting the first shaft and the third shaft; the third clutch may be disposed for selectively connecting the first shaft and the fifth shaft; the fourth clutch may be disposed for selectively connecting the second shaft and the third shaft; the fifth clutch may be disposed for selectively connecting the third shaft and the sixth shaft; and the sixth clutch may be disposed for selectively connecting the fourth shaft and the fifth shaft.

The first clutch may be disposed for selectively connecting the second rotary element of the first planetary gear set and the transmission case; the second clutch may be disposed for selectively connecting the second rotary element of the first planetary gear set and the first rotary element of the second planetary gear set; the third clutch may be disposed for selectively connecting the second rotary element of the first planetary gear set and the first rotary element of the third planetary gear set; the fourth clutch may be disposed for selectively connecting the third rotary element of the first planetary gear set and the first rotary element of the second planetary gear set; the fifth clutch may be disposed for selectively connecting the first rotary element of the second planetary gear set and the first rotary element of the fourth planetary gear set; and the sixth clutch may be disposed for selectively connecting the third rotary element of the second planetary gear set and the first rotary element of the third planetary gear set.

As described above, since the rotary elements of the first, second, third, and fourth planetary gear sets are selectively connected/disconnected by a plurality of clutches, their rotational speeds and directions are changed and shifting is performed accordingly. Therefore, a vehicle can be driven with the gear ratios of ten or more steps of forward shifting and one step of reverse shifting. Therefore, it is possible to improve fuel efficiency by implementing multiple steps of shifting and improve vehicle driving comfort by using operating points in a low RPM range of an engine.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figures 1, 2:
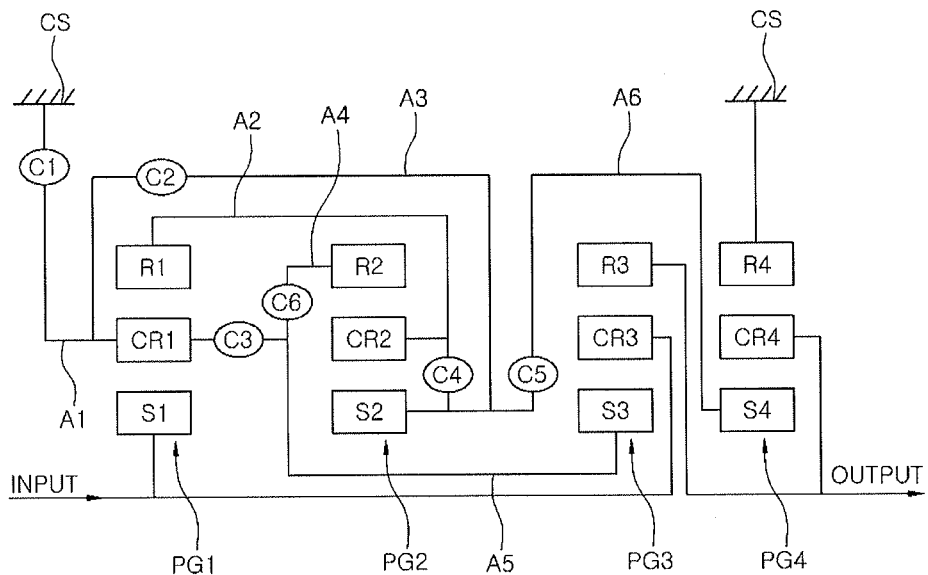
FIG. 1 is a diagram schematically showing the structure of a transmission for a vehicle according to an embodiment of the present invention.
FIG. 2 is a table showing operation in each range by a transmission for a vehicle according to an embodiment of the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A transmission for a vehicle according to an embodiment of the present invention largely includes a first planetary gear set PG1, a second planetary gear set PG2, a third planetary gear set PG3, and a fourth planetary gear set PG4, and the planetary gear sets each may include a plurality of rotary elements such as three rotary elements, that is, first, second, and third rotary elements.

Referring to FIG. 1, the first rotary element of the first planetary gear set PG1 may be connected to an input shaft INPUT. For example, the first rotary element of the first planetary gear set PG1 may be a first sun gear S1 and the first sun gear S1 may operate as or consistently as an input element by being directly connected to the input shaft INPUT.

The second rotary element of the first planetary gear set PG1 may operate as a selectively-fixed element. For example, the second rotary element of the first planetary gear set PG1 may be a first carrier CR1 and the first carrier CR1 can be connected to or disconnected from a transmission case CS by engaging or disengaging a friction member.

The second rotary element of the first planetary gear set PG1 may be selectively connected with the first rotary element of the second planetary gear set PG2. For example, the first rotary element of the second planetary gear set PG2 may be a second sun gear S2, and the first carrier CR1 and the second sun gear S2 can be connected to or disconnected from each other by engaging or disengaging a friction member.

The second rotary element of the first planetary gear set PG1 may be selectively connected with the first rotary element of the third planetary gear set PG3. For example, the first rotary element of the third planetary gear set PG3 may be a third sun gear S3, and the first carrier CR1 and the third sun gear S3 can be connected to or disconnected from each other by engaging or disengaging a friction member.

The third rotary element of the first planetary gear set PG1 may be selectively connected with the first rotary element of the second planetary gear set PG2. For example, the third rotary element of the first planetary gear set PG1 may be a first ring gear R1 and the first rotary element of the second planetary gear set PG2 may be a second sun gear S2, so the first ring gear R1 and the second sun gear S2 can be connected to or disconnected from each other by engaging or disengaging a friction member.

The third rotary element of the first planetary gear set PG1 may be selectively connected with the second rotary element of the second planetary gear set PG2. For example, the second rotary element of the second planetary gear set PG2 may be a second carrier CR2, and the first ring gear R1 and the second carrier CR2 may be directly connected to each other.

The first rotary element of the third planetary gear set PG3 may be selectively connected with the third rotary element of the second planetary gear set PG2. For example, the first rotary element of the third planetary gear set PG3 may be a third sun gear S3 and the third rotary element of the second planetary gear set PG2 may be a second ring gear R2, so the third sun gear S3 and the second ring gear R2 can be connected to or disconnected from each other by engaging or disengaging a friction member.

The second rotary element of the third planetary gear set PG3 may be connected to the input shaft INPUT. For example, the second rotary element of the third planetary gear set PG3 may be a third carrier CR3 and the third carrier CR3 may operate as or consistently as an input element by being directly connected to the input shaft INPUT.

The third rotary element of the third planetary gear set PG3 may be connected to an output shaft OUTPUT. For example, the third rotary element of the third planetary gear set PG3 may be a third ring gear R3 and the third ring gear R3 may operate as or consistently as an output element by being directly connected to the output shaft OUTPUT The first rotary element of the fourth planetary gear set PG4 may be selectively connected with the first rotary element of the second planetary gear set PG2. For example, the first rotary element of the fourth planetary gear set PG4 may be a fourth sun gear S4 and the first rotary element of the second planetary gear set PG2 may be a second sun gear S2, so the fourth sun gear S4 and the second sun gear S2 can be connected to or disconnected from each other by engaging or disengaging a friction member.

The second rotary element of the fourth planetary gear set PG4 may be connected to the output shaft OUTPUT. For example, the second rotary element of the fourth planetary gear set PG4 may be a fourth carrier CR4 and the fourth carrier CR4 may operate as or consistently as an output element by being directly connected to the output shaft OUTPUT.

The third rotary element of the fourth planetary gear set PG4 may operate as a fixed element. For example, the third rotary element of the fourth planetary gear set PG4 may be a fourth ring gear R4 and the fourth ring gear R4 may operate as or consistently as a fixed element by being directly connected to the transmission case CS.

In the present invention, the first planetary gear set PG1, second planetary gear set PG2, third planetary gear set PG3, and fourth planetary gear set PG4 may be sequentially arranged in the axial direction of the input shaft INPUT and the output shaft OUTPUT. Further, all of the first planetary gear set PG1, second planetary gear set PG2, third planetary gear set PG3, and fourth planetary gear set PG4 may be single pinion planetary gear sets.

The present invention may further include a plurality of friction members connected to at least one or more of the rotary elements of the planetary gear sets and controlling rotation of the rotary elements. The friction members may be first, second, third, fourth, fifth, and sixth clutches C1, C2, C3, C4, C5, and C6.

In detail, the first clutch C1 may be disposed for connecting/disconnecting the first carrier CR1, which is the second rotary element of the first planetary gear set PG1, and the transmission case CS.

The second clutch C2 may be disposed for connecting/disconnecting the first carrier CR1 that is the second rotary element of the first planetary gear set PG1 and the second sun gear S2 that is the first rotary element of the second planetary gear set PG2.

The third clutch C3 may be disposed for connecting/disconnecting the first carrier CR1 that is the second rotary element of the first planetary gear set PG1 and the third sun gear S3 that is the first rotary element of the third planetary gear set PG3.

The fourth clutch C4 may be disposed for connecting/disconnecting the first ring gear R1 that is the third rotary element of the first planetary gear set PG1 and the second sun gear S2 that is the first rotary element of the second planetary gear set PG2.

The fifth clutch C5 may be disposed for connecting/disconnecting the second sun gear S2 that is the first rotary element of the second planetary gear set PG2 and the fourth sun gear S4 that is the first rotary element of the fourth planetary gear set PG4.

The sixth clutch C6 may be disposed for connecting/disconnecting the second ring gear R2 that is the third rotary element of the second planetary gear set PG2 and the third sun gear S3 that is the first rotary element of the third planetary gear set PG3.

On the other hand, the rotary elements of the planetary gear sets may be connected through the input shaft INPUT, a first shaft A1 to a sixth shaft A6, and the output shaft OUTPUT.

Referring to FIG. 1, the first rotary element of the first planetary gear set PG1 and the second rotary element of the third planetary gear set PG3 may be directly connected to the input shaft INPUT.

The second rotary element of the first planetary gear set PG1, a first side of the first clutch C1, a first side of the second clutch C2, and a first side of the third clutch C3 may be connected to the first shaft A1.

The third rotary element of the first planetary gear set PG1, the second rotary element of the second planetary gear set PG2, and a first side of the fourth clutch C4 may be connected to the second shaft A2.

The first rotary element of the second planetary gear set PG2, a second side of the second clutch C2, a second side of the fourth clutch C4, and a first side of the fifth clutch C5 may be connected to the third shaft A3.

The third rotary element of the second planetary gear set PG2 and a first side of the sixth clutch C6 may be connected to the fourth shaft A4.

The first rotary element of the third planetary gear set PG3, a second side of the third clutch C3, and a second side of the sixth clutch C6 may be connected to the fifth shaft A5.

The first rotary element of the fourth planetary gear set PG4 and a second side of the fifth clutch C5 may be connected to the sixth shaft A6.

The third rotary element of the third planetary gear set PG3 and the second rotary element of the fourth planetary gear set PG4 may be directly connected to the output shaft OUTPUT.

The third rotary element of the fourth planetary gear set PG4 and a second side of the first clutch C1 may be connected to the transmission case CS.

For example, the first clutch C1 may be disposed for connecting/disconnecting the first shaft A1 and the transmission case CS, the second clutch C2 may be disposed for connecting/disconnecting the first shaft A1 and the third shaft A3, and the third clutch C3 may be disposed for connecting/disconnecting the first shaft A1 and the fifth shaft A5.

Further, the fourth clutch C4 may be disposed for connecting/disconnecting the second shaft A2 and the third shaft A3, the fifth clutch C5 may be disposed between the third shaft A3 and the sixth shaft A6, and the sixth clutch C6 may be disposed for connecting/disconnecting the fourth shaft A4 and the fifth shaft A5.

FIG. 2 is a table showing operation in each range by a transmission for a vehicle according to an embodiment of the present invention. In the illustrated embodiment, for example, in order to implement a 1-range gear ratio, the second clutch C2, fourth clutch C4, and fifth clutch C5 may be connected and all other friction members may be disconnected.

In order to implement a 2-range gear ratio, the second clutch C2, fifth clutch C5, and sixth clutch C6 may be connected and all other friction members may be disconnected. Further, as for the other ranges, a vehicle can be driven with the gear ratios corresponding to the ranges by selectively engaging/disengaging different clutches, as shown in the table.

As described above, since the rotary elements of the first, second, third, and fourth planetary gear sets PG1, PG2, PG3, and PG4 are selectively connected/disconnected by a plurality of clutches, their rotational speeds and directions are changed and shifting is performed accordingly. Therefore, a vehicle can be driven with the gear ratios of ten or more steps of forward shifting and one step of reverse shifting. Therefore, it is possible to improve fuel efficiency by implementing multiple steps of shifting and improve vehicle driving comfort by using operating points in a low RPM range of an engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle, comprising:
   a first planetary gear set, a second planetary gear set, a third, planetary gear set, and a fourth planetary gear set each including three rotary elements; and
   a plurality of friction members, wherein:
   the first planetary gear set includes: a first rotary element connected to an input shaft; a second rotary element operating as a selectively-fixed element and selectively connected with a first rotary element of the second planetary gear set and selectively connected with a first rotary element of the third planetary gear set; and a third rotary element selectively connected with the first rotary element of the second planetary gear set and directly connected with a second rotary element of the second planetary gear set,
   the third planetary gear set includes: the first rotary element selectively connected with a third rotary element of the second planetary gear set; a second rotary element connected to the input shaft; and a third rotary element connected to an output shaft,
   the fourth planetary gear set includes: a first rotary element selectively connected with the first rotary element of the second planetary gear set; a second rotary element connected to the output shaft; and a third rotary element operating as a fixed element, and
   the friction members are connected to at least one or more of the rotary elements of the planetary gear sets and control rotation of the rotary elements.

2. The transmission of claim 1, wherein:
   in the first planetary gear set, the first rotary element is a first sun gear, the second rotary element is a first carrier, and the third rotary element is a first ring gear,
   in the second planetary gear set, the first rotary element is a second sun gear, the second rotary element is a second carrier, and the third rotary element is a second ring gear,
   in the third planetary gear set, the first rotary element is a third sun gear, the second rotary element is a third carrier, and the third rotary element is a third ring gear, and
   in the fourth planetary gear set, the first rotary element is a fourth sun gear, the second rotary element is a fourth carrier, and the third rotary element is a fourth ring gear.

3. The transmission of claim 2, wherein:
   the second rotary element of the first planetary gear set is connected to or disconnected from a transmission case by engaging or disengaging a first clutch,
   the second rotary element of the first planetary gear set and the first rotary element of the second planetary gear set are connected to or disconnected from each other by engaging or disengaging a second clutch,
   the second rotary element of the first planetary gear set and the first rotary element of the third planetary gear set are connected to or disconnected from each other by engaging or disengaging a third clutch, and
   the third rotary element of the first planetary gear set and the first rotary element of the second planetary gear set are connected to or disconnected from each other by engaging or disengaging a fourth clutch.

4. The transmission of claim 2, wherein the first rotary element of the third planetary gear set and the third rotary element of the second planetary gear set are connected to or disconnected from each other by engaging or disengaging a sixth clutch.

5. The transmission of claim 2, wherein the first rotary element of the fourth planetary gear set and the first rotary element of the second planetary gear set are connected to or disconnected from each other by engaging or disengaging a fifth clutch.

6. The transmission of claim 2, wherein the first planetary gear set, the second planetary gear set, the third planetary gear set, and the fourth planetary gear set are sequentially arranged in an axial direction of the input shaft or the output shaft.

7. The transmission of claim 1, wherein the friction members include:
- a first clutch disposed for selectively connecting the second rotary element of the first planetary gear set and a transmission case;
- a second clutch disposed for selectively connecting the second rotary element of the first planetary gear set and the first rotary element of the second planetary gear set;
- a third clutch disposed for selectively connecting the second rotary element of the first planetary gear set and the first rotary element of the third planetary gear set;
- a fourth clutch disposed for selectively connecting the third rotary element of the first planetary gear set and the first rotary element of the second planetary gear set;
- a fifth clutch disposed for selectively connecting the first rotary element of the second planetary gear set and the first rotary element of the fourth planetary gear set; and
- a sixth clutch disposed for selectively connecting the third rotary element of the second planetary gear set and the first rotary element of the third planetary gear set.

8. A transmission for a vehicle, comprising:
- a first planetary gear set, a second planetary gear set, a third planetary gear set, and a fourth planetary gear set each including three rotary elements;
- an input shaft connected to a first rotary element of the first planetary gear set and a second rotary element of the third planetary gear set;
- a first shaft connecting a second rotary element of the first planetary gear set, a first clutch, a second clutch, and a third clutch;
- a second shaft connecting a third rotary element of the first planetary gear set, a second rotary element of the second planetary gear set, and a fourth clutch;
- a third shaft connecting a first rotary element of the second planetary gear set, the second clutch, the fourth clutch, and a fifth clutch;
- a fourth shaft connecting a third rotary element of the second planetary gear set and a sixth clutch;
- a fifth shaft connecting a first rotary element of the third planetary gear set, the third clutch, and the sixth clutch;
- a sixth shaft connecting a first rotary element of the fourth planetary gear set and the fifth clutch;
- an output shaft connecting a third rotary element of the third planetary gear set and a second rotary element of the fourth planetary gear set; and
- a transmission case connected with a third rotary element of the fourth planetary gear set and the first clutch.

9. The transmission of claim 8, wherein:
the first clutch is disposed for selectively connecting the first shaft and the transmission case,
the second clutch is disposed for selectively connecting the first shaft and the third shaft,
the third clutch is disposed for selectively connecting the first shaft and the fifth shaft,
the fourth clutch is disposed for selectively connecting the second shaft and the third shaft,
the fifth clutch is disposed for selectively connecting the third shaft and the sixth shaft, and
the sixth clutch is disposed for selectively connecting the fourth shaft and the fifth shaft.

10. The transmission of claim 9, wherein:
the first clutch is disposed for selectively connecting the second rotary element of the first planetary gear set and the transmission case,
the second clutch is disposed for selectively connecting the second rotary element of the first planetary gear set and the first rotary element of the second planetary gear set,
the third clutch is disposed for selectively connecting the second rotary element of the first planetary gear set and the first rotary element of the third planetary gear set,
the fourth clutch is disposed for selectively connecting the third rotary element of the first planetary gear set and the first rotary element of the second planetary gear set,
the fifth clutch is disposed for selectively connecting the first rotary element of the second planetary gear set and the first rotary element of the fourth planetary gear set, and
the sixth clutch is disposed for selectively connecting the third rotary element of the second planetary gear set and the first rotary element of the third planetary gear set.

* * * * *